Sept. 20, 1927.

J. A. BARRETT 1,642,713

TRACTION ATTACHMENT FOR VEHICLE POWER WHEELS

Filed Feb. 28, 1927

Inventor

John A. Barrett,

By Clarence A. O'Brien
Attorney

Patented Sept. 20, 1927.

1,642,713

UNITED STATES PATENT OFFICE.

JOHN ALTON BARRETT, OF McMILLAN, MICHIGAN.

TRACTION ATTACHMENT FOR VEHICLE POWER WHEELS.

Application filed February 28, 1927. Serial No. 171,663.

This invention relates to new and useful improvements in traction attachments for vehicle power wheels, and has for its primary object to provide a highly novel, simple, and relatively inexpensive traction wheel that is constructed so as to facilitate the rigid securing of the same to a vehicle power wheel at either the inner or outer side thereof, and having means at its periphery for positively gripping the road surface so as to prevent the slipping of the same in snow or mud.

In carrying out the present invention, it is preferable, though not absolutely necessary that each vehicle power wheel be equipped with a pair of my traction devices, those of each pair being of identical construction and adapted to be securely arranged upon the inner and outer sides of the wheel, it only being necessary that the inner traction device be of less width than the one arranged upon the outer side of wheel.

A further and important object is to provide a traction device of this character that is so constructed as to permit of the attachment of the same to a vehicle wheel without requiring any attaching devices other than the usual rim lug bolts of a conventional automobile traction wheel.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views.

Figure 1:
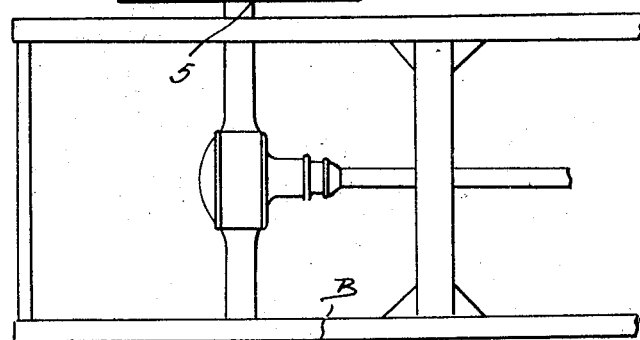
Figure 1 is a fragmentary top plan of the rear end of a motor vehicle chassis, the power wheels thereof being equipped with a pair of traction devices constructed in accordance with the present invention.
Figure 2:
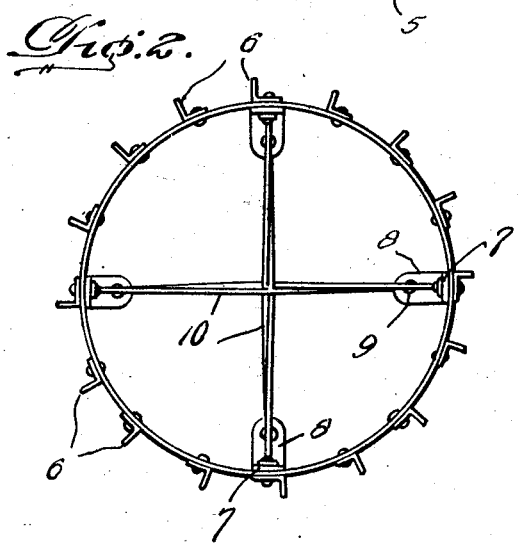
Figure 2 is an outer side elevation of one of the traction devices.
Figure 3:
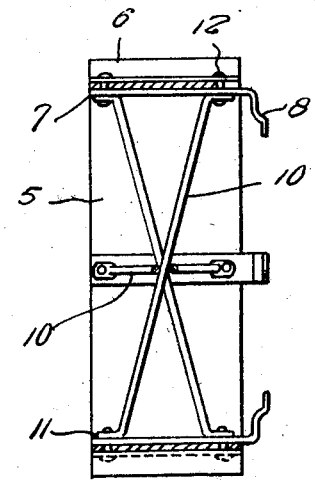
Figure 3 is a detail sectional view thereof.

Now having particular reference to the drawing, my novel traction attachment consists of a circular metallic band 5 of predetermined width and diameter having upon its outer surface circumferentially spaced transversely arranged metallic L-bars 6 for providing road gripping lugs. Arranged transversely upon the inner face of the band 5 are metallic straps 7, the inner ends of which are extended beyond the band 5 and bent inwardly to provide lugs 8, the ends thereof being formed with openings 9.

Arranged diagonally within the band 5 are stress distributing rods 10, preferably four in number, the ends of which are provided with lateral lugs 11 for engagement upon the metallic straps 7, after which the same are secured to the strap and the straps to the bands, and also certain of the lugs 6 to the outer surface of the bands by rivets 12.

The present traction device is primarily adapted for association with a tired automobile traction wheel A, the tire of which is demountably arranged upon the wheel by reason of the usual rim lugs arranged upon the outer ends of wheel felly carrying bolts B. The number of straps 7 upon the inner surface of the band 5 is complementary to the number of the lug bolts B of the wheel A, with which the device is to be associated, said stops being of similar spaced relation as said bolts, while the lugs 8 upon the inner ends of these straps are so bent as to permit the same to pass over the usual side flanges of a demountable rim so that the extreme inner ends thereof may contact the wheel and be engaged over the outer ends of the bolts B after the usual nuts have been removed therefrom. Obviously after these lugs have been arranged over the bolts, the usual nuts are placed upon the bolts so that the device is firmly attached to the wheel.

In carrying out the present invention it is preferable that a pair of these traction devices be provided for each vehicle traction wheel as suggested in Figure 1. However, in this instance it will be necessary that the innermost traction device of each wheel must be of less width than the outermost device.

It will thus be seen that I have provided a highly novel, simple, and efficient traction device for vehicle power wheels that is well adapted for all the purposes heretofore designated, and even though I have herein shown and described the invention as consisting of certain detail structural elements it is nevertheless to be understood that some changes may be made therein without affecting the spirit and scope of the appended claim.

Having thus described the invention, what I claim is:—

In a traction device for automobile power wheels, wherein the fellies thereof are equipped with transversely extending demountable rim lug retaining bolts, a single metallic band of predetermined width and diameter, cross cleats arranged upon the outer surface of the band, transverse metallic straps arranged upon the inner surface of the band and equal in number to the number of the wheel lug bolts, stress distributing rods arranged diagonally within the band and attached at their opposite ends to opposed straps and to the band and means upon the inner ends of said straps for facilitating the securing of the same to the wheel lug bolts.

In testimony whereof I affix my signature.

JOHN ALTON BARRETT.